March 26, 1929.   H. B. VESTED   1,706,425
ADAPTER FOR TRAILER COUPLING DEVICES
Filed March 23, 1928   2 Sheets-Sheet 2
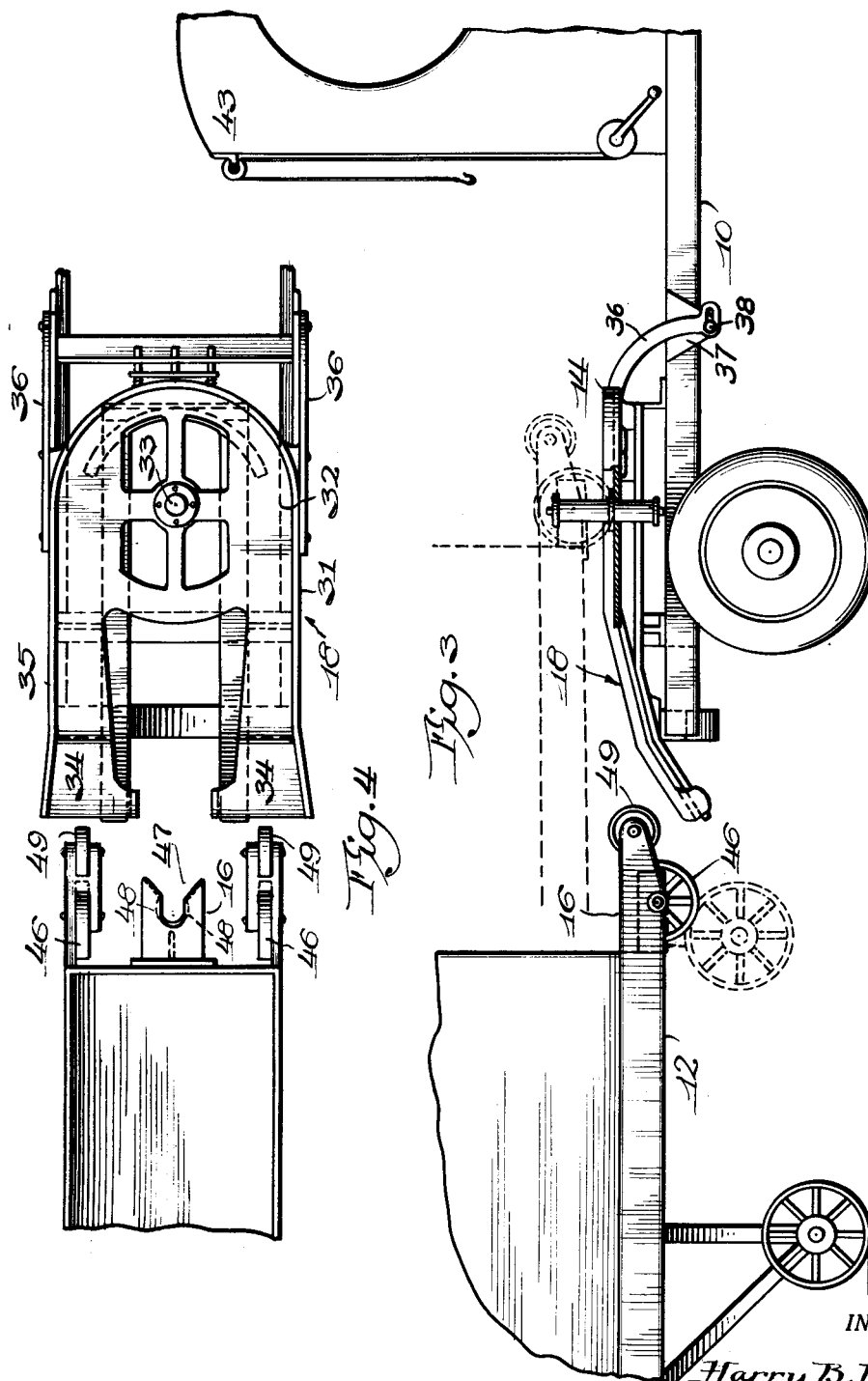
INVENTOR.
*Harry B. Vested,*
BY
*Clarence E. Mehlhope*
ATTORNEY.
Witness:
*Chas. R. Koursh.*

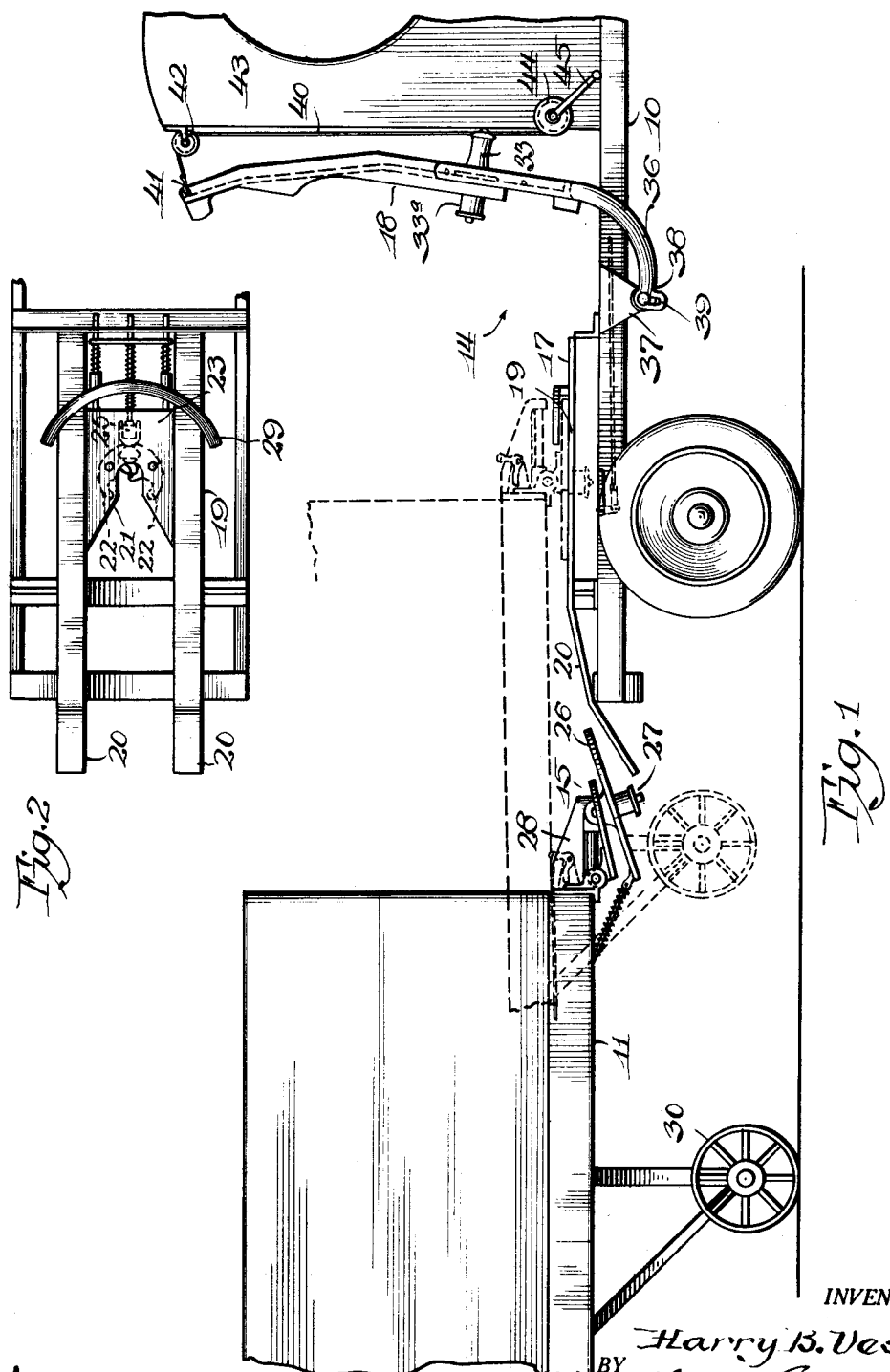

Patented Mar. 26, 1929.

1,706,425

UNITED STATES PATENT OFFICE.

HARRY B. VESTED, OF CHICAGO, ILLINOIS.

ADAPTER FOR TRAILER-COUPLING DEVICES.

Application filed March 23, 1928. Serial No. 264,064.

This invention relates to a novel and improved adapter for a trailer coupling device and consists of the matters hereinafter described and more particularly pointed out in the appended claims.

There are two well known semi-trailers now on the market with associated tractor vehicles to which they are adapted to be automatically coupled or uncoupled, without the driver leaving the tractor vehicle. One is known as the Lapeer semi-trailer and the other, as the Trailmobile semi-trailer, The semi-trailers and their associated tractor vehicles are provided with co-operative coupling members; but the coupling device of the Lapeer semi-trailer is quite different from that of the Trailmobile semi-trailer so that it is impossible for the semi-trailer of one type to be coupled to the tractor vehicle associated with the other type of semi-trailer. This is a manifestly objectionable feature to those who, having acquired a tractor vehicle and one or more semi-trailers of one type, may desire to acquire a semi-trailer of the other type for use with the same tractor vehicle.

The object of the present invention is to provide a combination coupling device including an adapter or interchangeable member, which when applied to a tractor vehicle, makes it possible to couple that vehicle either to a Trailmobile semi-trailer or to a Lapeer semi-trailer by a simple shifting of the interchangeable member.

The advantages of the invention will appear more fully as I proceed with my specification.

In the drawings:—

Figure 1 is a view representing in side elevation the rear end of a tractor vehicle provided with the improved adapter with the front end of a semi-Trailmobile with the two in position ready for coupling.

Figure 2 is a top plan view of the part of the coupling device included in the coupling member on the tractor vehicle by which the semi-trailer shown in Figure 1 may be coupled to the tractor vehicle shown in Figure 1.

Figure 3 is a view similar to Figure 1, showing the same tractor vehicle in position ready to be coupled to a semi-trailer of another type, namely, the Lapeer semi-trailer.

Figure 4 is a top plan view of the coupling members of the tractor vehicle and semi-trailer in the relative positions shown in Figure 3.

Referring now to that embodiment of my invention illustrated in the drawings:—10 indicates the frame of the tractor vehicle; 11 indicates the frame of a semi-trailer of one type, in this case the semi-Trailmobile; 12 indicates the frame of a semi-trailer of another type, namely the Lapeer semi-trailer; 14 indicates as a whole the coupling member on the tractor vehicle frame 10; 15 indicates the coupling member on the semi-Trailmobile frame 11; and 16 indicates the coupling member on the Lapeer semi-trailer frame 12.

The improved coupling device on the tractor vehicle comprises two interchangeable members, namely a coupling member 17 and a coupling member 18. The one coupling member 17, is adapted to couple the tractor vehicle to a semi-Trailmobile. The other coupling member 18, is adapted for coupling the tractor vehicle to a Lapeer semi-trailer.

The coupling member 17 includes a lower fifth-wheel 19 mounted on the tractor frame 10. Said fifth-wheel comprises the two inclined, laterally spaced skids 20, 20 and the coupling jaw mechanism 21. Said jaw mechanism consists of two coupling jaws 22, 22 pivotally mounted on a plate 23 which is carried between the skids 20, 20 and connected to the frame 10 in such manner as to be capable of a limited back and forth movement controlled by draft springs (not shown). A spring controlled locking plunger 25, is adapted to lock the jaws in closed relation when they are engaged by the coupling member on the semi-trailer.

The coupling member 15 on the semi-trailer 11 consists of an upper fifth-wheel 26 with a king bolt 27 fixed thereto, the same being mounted to swing on a horizontal axis on a block 28 projecting from the frame 11 of the semi-trailer.

The coupling device thus far described is well known and is of the type including both members employed in coupling a semi-Trailmobile to the tractor vehicles associated therewith. When the tractor vehicle is backed up against the front end of the semi-trailer, the inclined skids 20 of the lower fifth-wheel 19 on the tractor vehicle pass under the upper fifth-wheel 26 on the semi-Trailmobile at each side of the king bolt 27, and, in the continued movement of the tractor vehicle, engage the bottom of said fifth-wheel and cause it to ride up on the skids 20, 20 until the king bolt 27 is engaged by the jaws 22 to which they are locked by means of the spring controlled plunger 25. 29 indicates a quadrant included in the lower fifth-wheel on the tractor vehicle.

Other functions are accomplished in the bringing together of the two coupling elements of the tractor vehicle and of the semi-trailer, such for example as the lifting of the wheels 30 of the semi-trailer from the position shown in full lines to that shown in dotted lines in Figure 1 and the release of the brake on the rear wheels of the semi-trailer, (not shown); but these functions are of no interest in the present application.

The other coupling member 18 on the tractor vehicle 10 is generally of the construction of that provided on tractor vehicles which are associated with Lapeer semi-trailers. It includes a lower fifth-wheel 31 in the form of a platform or table having a circular part 32 concentric with a king bolt 33 and laterally spaced, comparatively wide skids 34, 34. A flange 35 extending along the edges of the skids 34 and about the circular table 32 acts as a guide for the wheels carried by the Lapeer semi-trailer for elevating the same when coupling it to the tractor vehicle in a familiar manner. The fifth-wheel is rigidly attached to laterally spaced, parallel arms 36, 36, which project beyond the circular table 32 of said wheel and embrace the side members of the frame 10 of the tractor vehicle. Said arms are pivotally connected to bracket plates 37 which are rigidly fixed to said frame 10. The pivotal connection is by means of a pin and slot 38, 39 so that a slight longitudinal play of the coupling member 18 as a whole is provided in the connection.

A rope or cable 40 attachable by a hook 41 to the end of one of the skids 34, passes about a pulley 42 attached to the cab 43 of the tractor vehicle and thence down about a drum 44 upon which it is wound. Said drum is suitably mounted on the side of the cab 43 and is operable by means of a crank 45. By this construction the coupling member 18 may be lowered to operative position in the plane of the coupling member 17, as shown in Figures 3 and 4, or may be drawn back out of the way to inoperative position, as shown in Figure 1.

The king bolt 33 on the coupling member 18 extends not only above the table 33, but also below the same, as indicated at 33ª. When the coupling member 18 is lowered down upon the top of the coupling member 17, the part 33ª of the king bolt will depend in the space between the pivoted jaws 22 of the coupling member 17 and may be made to engage therewith when the coupling member 18 as a whole is moved bodily backwards towards the cab 43, said movement being made possible by the pin and slot connection hereinbefore referred to. (See Figure 3).

The coupling member 16 on the Lapeer semi-trailer consists of the upper fifth-wheel constituted by the pair of wheels 46, 46 mounted on projecting members of the frame 12, which wheels are adapted to engage and run up on the skids 34 of the lower fifth-wheel 31 of the coupling member 18, and of a jaw device 47 carrying the pivoted jaws 48, 48 which are adapted to engage and to be locked upon the king pin 33 of the coupling member 18. Auxiliary wheels 49, 49 are also carried by the projecting members of the frame 12, said wheels being located in advance of the wheels 46 and being intended to engage the skids 34, 34 in case the wheels 46, by reason of uneven ground at the time of coupling, are too low to properly engage the skids.

When the coupling member, or, as we may call it the adapter 18, is in operative position, as shown in Figure 3, the tractor vehicle may be automatically coupled to the Lapeer semi-trailer in the same manner as heretofore described for the connection with the Trailmobile semi-trailer, since the coupling member on the tractor vehicle is now of the kind adapted for coupling to the upper fifth-wheel mechanism and lock mechanism on a Lapeer semi-trailer.

It will be manifest from the foregoing that my improved coupling member, when applied to a tractor vehicle, makes it possible to couple the tractor vehicle to semi-trailers with either type of locking member described herein. The tractor vehicle having been in use in connection with Lapeer semi-trailers, as in the examples illustrated in Figures 3 and 4, may, after being uncoupled therefrom, be quickly adapted for coupling to a semi-Trailmobile by simply shifting the coupling member 18 or the adapter rearwardly, first disengaging the plunger 25, and by then swinging it upwardly upon its pivotal connection with the plates 37, into the inoperative position shown in Figure 1. Thereupon the tractor vehicle is ready to be coupled to a semi-Trailmobile provided with the usual coupling member associated therewith.

It will be noted that the two coupling devices described herein differ mainly and essentially in the fact that in the one, namely in that designed for the semi-Trailmobile, the king pin or male member of the coupling device is carried by the coupling member attached to the semi-trailer, while the locking jaws or female member of the coupling device form a part of the coupling member carried by the tractor vehicle. In the case of the other coupling device, namely that designed for the Lapeer semi-trailer, this arrangement is reversed and the king bolt or male member of the coupling device is carried by the coupling member applied to the tractor vehicle, while the locking jaws or female member of that coupling device are carried by the coupling member attached attached to the semi-trailer.

My combination coupling member with the adapter, includes a coupling member of each type, namely one containing the locking jaws or female member and the second containing the king bolt or male member; but in addition, the coupling member provided with the king bolt carries an auxiliary male member, namely the depending part of the king bolt, by means of which the male coupling member with the king bolt may be locked to and become a part of the female coupling member on the tractor vehicle.

I claim as my invention:

1. A combination coupling device for tractor vehicles adapted for use with either a male or female coupling member on semi-trailers, comprising a coupling member permanently attached to the frame of the tractor vehicle, said coupling member being of the female type, and a second coupling member of the male type movably connected to the frame of said tractor vehicle and adapted to be brought into position on top of the first named coupling member or to be removed to an inoperative position away from said first named coupling member, said second named coupling member being provided with an auxiliary male member adapted for locking engagement with the first named coupling member.

2. A combination coupling device for tractor vehicles adapted for use with either a male or female coupling member on semi-trailers comprising a coupling member permanently attached to the frame of the tractor vehicle, said coupling member being of the female type, and a second coupling member of the male type connected to the frame of said tractor vehicle and adapted to be brought into position on top of the first named coupling member or to be removed to an inoperative position away from said first named coupling member, said second named coupling member being provided with an auxiliary male member adapted for locking engagement with the first named member, and means connecting said second named coupling member to the frame of said tractor vehicle adapted to permit the required movement of the second named coupling member relative to said first named coupling member, when the second coupling member is in position on the first named coupling member, to bring about locking engagement between the two.

3. In combination with a tractor vehicle, a combination coupling member carried thereby including a coupling member having jaws for locking engagement with the king bolt and plunger for holding said jaws locked in engagement with said king bolt, and an interchangeable coupling member connected to the frame of said tractor vehicle and adapted to be brought into position on top of the first named coupling member or to be swung to an inoperative position away from said first named coupling member, and a king bolt carried by said second named coupling member, said king bolt having a depending projection adapted to be lockingly engaged by the jaws of said first named coupling member.

4. In combination with a tractor vehicle, a coupling member carried thereby, said coupling member including jaws for locking engagement with a king bolt and a plunger for holding said jaws locked in engagement with the king bolt, and an interchangeable coupling member pivoted to the frame of said tractor vehicle and being capable of a swinging movement from a position on top of said first named coupling member to an inoperative position removed from said first named coupling member, a king bolt carried by said second named coupling member, said king bolt having a depending projection, and means pivotally connecting said second coupling member to the frame of said tractor vehicle adapting said coupling member to be moved longitudinally when in position on the top of said first named coupling member to bring the depending part of said king bolt into locking engagement with the locking jaws of said first named coupling member.

5. A combination coupling device for tractor vehicles adapted for use with either a male or female coupling member on semi-trailers, comprising a coupling member permanently attached to the frame of the tractor vehicle, said coupling member being of the female type, and a second coupling member of the male type, said second named member being provided with an auxiliary male member adapted for locking engagement with the first named coupling member.

6. A combination coupling device for tractor vehicles adapted for use with either a male or female coupling member on semi-trailers, comprising a coupling member of the female type and a second coupling member of the male type, said second coupling member being provided with an auxiliary male member adapted for locking engagement with the first named coupling member and one of said coupling members being permanently attached to the frame of said tractor vehicle.

7. A combination coupling device adapted for use either with a male or female coupling member, comprising a coupling member permanently attached to the frame of the vehicle with which it is connected, and a second coupling member adapted for removable attachment thereon, one of said coupling members being of the male type and the other being of the female type, said coupling member of the male type being provided with an auxiliary male member adapted for locking engagement with the coupling member of the female type.

In testimony that I claim the foregoing as my invention, I affix my signature this 28th day of February A. D. 1928.

HARRY B. VESTED.